April 19, 1949.                W. LASAR                    2,467,532
                             BAND SAW TABLE
                          Filed Nov. 19, 1945

INVENTOR
WILLIAM LASAR
BY
ATTORNEY

Patented Apr. 19, 1949

2,467,532

UNITED STATES PATENT OFFICE 2,467,532

BAND-SAW TABLE

William Lasar, Los Angeles, Calif.

Application November 19, 1945, Serial No. 629,344

1 Claim. (Cl. 143—132)

My invention relates to band saws and has particular reference to a novel table construction for use with meat cutting band saws.

It is the common practice to employ band saws for the cutting of meat, particularly to produce conventional retail cuts, such as steaks and chops, since the cutting operation may be very quickly performed and, further, since clean, uniform cuts may be produced by the use of such improvements as the thickness gauge disclosed and claimed in my Patent No. 2,380,700, issued July 31, 1945, and the laterally oscillating table construction disclosed in my copending application Serial No. 629,345, filed November 19, 1945, issued July 20, 1948 as Patent No. 2,445,676, and entitled "Work table for band saws."

In general, meat cutting band saws of the type referred to comprise a main pedestal within which is mounted the driving mechanism for the endless band saw, together with the large diameter pulleys which are encircled by the saw. To the pedestal there is secured a work holding table which ordinarily projects forwardly from the front face of the pedestal a distance which varies, dependent upon the size of the saw and particularly with the size of the chunks of meat which are to be supported on the table and cut into the smaller retail cuts through operation of the saw.

It is common practice to use meat cutting band saws of this type in retail markets as well as in larger establishments, such as those of wholesale meat dealers, restaurant and hotel suppliers and the like. In all such establishments there usually exists a need to conserve floor and working space to as great an extent as is possible. The meat cutting band saws of the type referred to occupy a considerable amount of space which is wasted a large percentage of the time because the band saw is usually in operation only a small percentage of the total time. Of the space occupied by the meat cutting band saw, a large percentage is represented by the area beneath the work holding table which protrudes a considerable distance beyond the outline of the main pedestal.

It is, therefore, an object of my invention to provide a band saw which includes a work supporting table and in which the table is hingedly mounted for movement from a horizontal operating position to an idle position lying substantially against the body of the saw to minimize the space occupied by the assembly when not in use.

It is also an object of my invention to provide a saw of the character set forth in the preceding paragraph which includes means for holding the table securely in each of its two positions.

It is a still further object of my invention to provide a saw of the character set forth in the preceding paragraphs which is simple in construction and designed to minimize maintenance costs.

Other objects and advantages of my invention will be apparent from a study of the following specifications, read in connection with the accompanying drawings, wherein.

Figures 1, 2, 3:
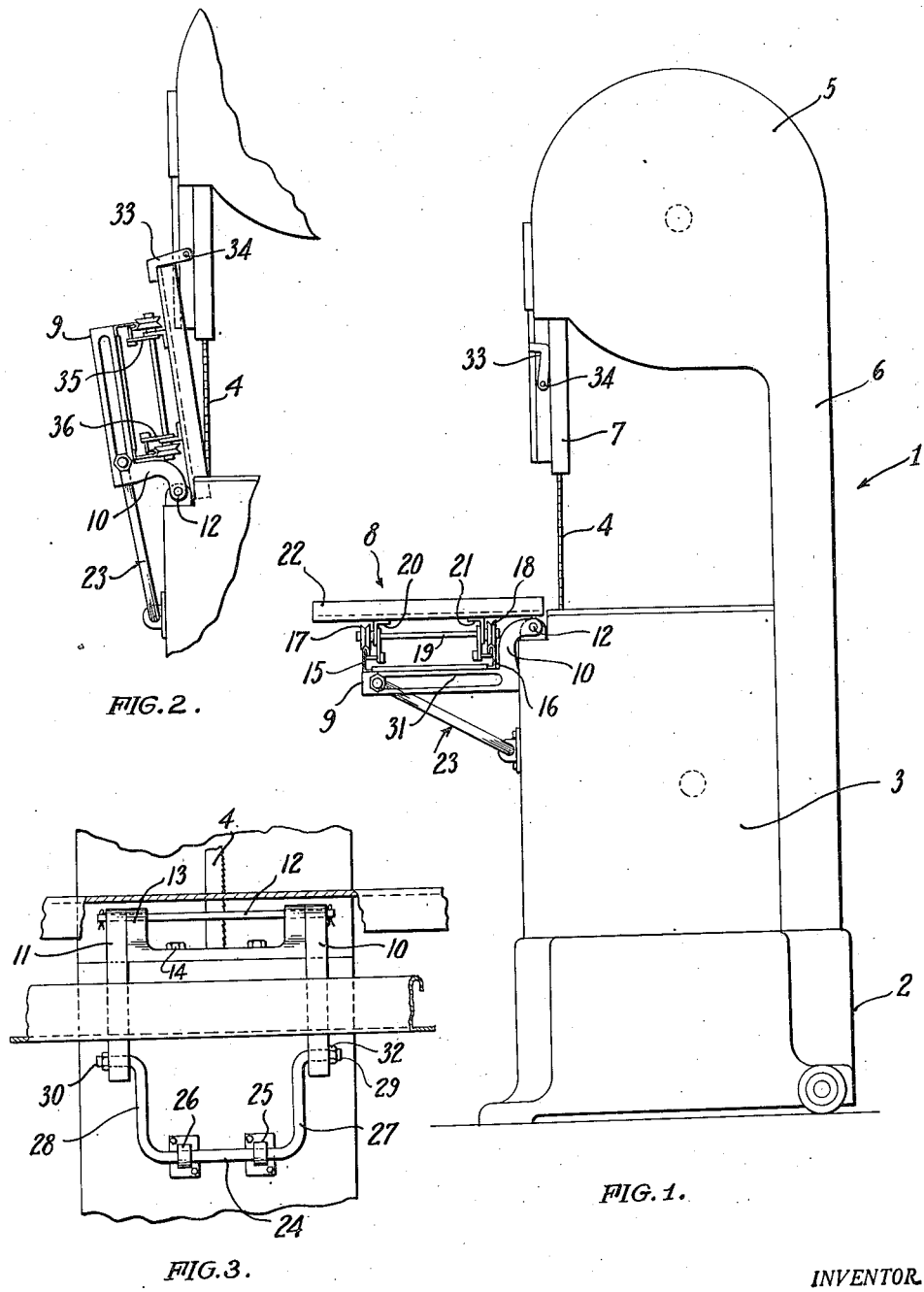
Fig. 1 is a side elevational view of a band saw of the type usually employed for the cutting of meat and illustrating also the improvement comprising my invention which consists in mounting the work holding table in such a way that when not in use, it may be moved to an idle position out of the way.
Fig. 2 is a fragmentary elevational view showing the position occupied by the work holding table when it is moved to an idle position minimizing the space occupied by the assembly.
Fig. 3 is a fragmentary front elevational view illustrating additional details of construction.

Referring to the drawings, I have illustrated in Fig. 1 a band saw of the type often employed for the cutting of meat as including a main pedestal indicated generally by the reference character 1. This pedestal comprises a base member 2 upon which is mounted a lower housing 3 for enclosing the drive mechanism and the lower one of the two large pulleys which are encircled by an endless band saw 4. The other of the pulleys is enclosed within an upper housing 5 supported upon an upwardly extending columnar portion 6 of the pedestal 1. From the front edge of the housing 5 there depends a saw guide 7 for holding the saw against displacement as a workpiece, such as a chunk of meat, is cut by the saw.

As is shown in Fig. 1, I provide at the front face of the pedestal 1 a work holding table which is indicated generally by the reference character 8. This table is normally supported in a horizontal operating position by a main supporting bracket 9 which includes a pair of hook-shaped anchor portions 10 and 11 which are pivotally attached to the pedestal 1 by means of a hinge pin 12 passed through suitable apertures in the portions 10 and 11 and mounted upon a suitable supporting bracket 13 which is in turn secured to the pedestal 1 as by means of bolts 14.

The supporting bracket 9 carries a pair of rails 15 and 16 upon which rollers 17 and 18 may roll. The rollers 17 and 18 are mounted as by means of a shaft 19 and brackets 20 and 21 to a work holding platform portion 22 of the table 8.

With this construction a piece of meat or other workpiece resting on the platform 2 may be moved laterally of the pedestal 1 and against the saw 4 to cut a piece from the workpiece by rolling the table along the tracks 15 and 16.

In order that the table 8 may be held securely in a substantially horizontal operating position such as that shown in Fig. 1, I provide a U-shaped brace member indicated generally at 23 which includes a horizontally extending rock bar 24 passed through brackets or journals 25 and 26 suitably secured to the front face of the pedestal 1. A pair of inclined portions 27 and 28 each terminate in laterally horizontally extending pin portions 29 and 30 which pass through longitudinal slots 31 formed in the supporting bracket 9. Nuts 32 applied to the ends of the pin portions 29 and 30 may be used to prevent the pins from becoming disengaged from the slots 31.

The length of the slots 31 is adjusted to cause the pin portions 29 and 30 to engage the ends of the slots 31 in the operating position shown in Fig. 1 to thereby securely hold the table 8 in such position. The slots 31 and the hinged construction including the hinge pin 12 permit the table to be swung to an idle position lying closely adjacent to and substantially parallel with the front face of the pedestal 1, as is shown in Fig. 2. The assembly may be held in that position by means of a hook or latch member 33 pivotally supported as indicated at 34 to the saw guide 7 and movable to a table engaging position such as is shown in Fig. 2.

Since the platform 22 merely rests upon the base support and rails 15 and 16, I provide a pair of downwardly and laterally extending brackets 35 and 36 which include portions passing beneath the undersurface of the rails 15 and 16 to prevent the movable portion of the table from being disengaged from the remainder of the construction.

From the foregoing it will be observed that I have provided a novel table construction for band saws which includes a means for hingedly mounting the table for movement from a substantially horizontal operating position to an idle position in which the table is positioned closely adjacent to and approximately parallel with the front face of the pedestal so as to minimize the space occupied by the saw assembly.

Attention is directed particularly to the fact that the brace member 23 which I have provided serves to hold the table secure and rigid in its operating position while at the same time permitting the table to be moved to its idle position, in which latter position it is held by the hook 33.

While I have shown and described the preferred embodiment of my invention, I do not desire to be limited to any of the details of construction shown or described herein, except as defined in the appended claim.

I claim.

In a band saw including a main pedestal and a band saw extending upwardly from said pedestal, the combination of: a supporting bracket normally extending horizontally from said pedestal and normally occupying an area in plan outside of the confines of said pedestal; a pair of horizontally extending parallel rails mounted on said bracket; a work holding table; roller means carried by said table and engaging said rails to mount said table for reciprocatory movement along said rails past said saw and parallel to the plane thereof; means hingedly securing said bracket to said pedestal for pivotal movement of said bracket and table from a normal operating position disposing said bracket and said table substantially horizontally to an idle position disposing said table and bracket closely adjacent to and approximately parallel with the face of said pedestal, said table in said idle position extending upwardly from the top of said main pedestal and alongside of said saw; and means for holding said bracket in each of said positions.

WILLIAM LASAR.

REFERENCES CITED

The following references are of record in the file of this patent:

UNITED STATES PATENTS

| Number | Name | Date |
| --- | --- | --- |
| 183,889 | Blauvelt | Oct. 31, 1876 |
| 275,139 | Carey | Apr. 3, 1883 |
| 1,193,525 | Dosch | Aug. 8, 1916 |
| 1,336,799 | Vaughan | Apr. 13, 1920 |
| 1,803,489 | Schueren | May 5, 1931 |